United States Patent
Qi et al.

(10) Patent No.: US 10,506,420 B2
(45) Date of Patent: Dec. 10, 2019

(54) METHODS, SYSTEMS, AND DEVICES FOR ENABLING MULTIPLE RADIO ASSISTED DISCOVERY

(71) Applicant: Intel Corporation, Santa Clara, CA (US)

(72) Inventors: Emily Qi, Gig Harbor, WA (US); Carlos Cordeiro, Portland, OR (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/250,296

(22) Filed: Jan. 17, 2019

(65) Prior Publication Data

US 2019/0281435 A1   Sep. 12, 2019

Related U.S. Application Data

(63) Continuation of application No. 15/492,241, filed on Apr. 20, 2017, now Pat. No. 10,219,141, which is a continuation of application No. 14/498,795, filed on Sep. 26, 2014, now abandoned.

(60) Provisional application No. 62/038,109, filed on Aug. 15, 2014.

(51) Int. Cl.
*H04W 8/00*    (2009.01)
*H04W 76/14*   (2018.01)
*H04W 4/80*    (2018.01)
*H04W 48/10*   (2009.01)
*H04W 48/16*   (2009.01)
*H04W 84/12*   (2009.01)

(52) U.S. Cl.
CPC ............. *H04W 8/005* (2013.01); *H04W 4/80* (2018.02); *H04W 48/10* (2013.01); *H04W 48/16* (2013.01); *H04W 76/14* (2018.02); *H04W 84/12* (2013.01)

(58) Field of Classification Search
CPC ...................................................... H04W 8/005
USPC ................................................ 455/434, 435.2
See application file for complete search history.

(56) References Cited

U.S. PATENT DOCUMENTS

2015/0296416 A1* 10/2015 Lee ................. H04W 8/005
                                                370/331
2015/0341849 A1* 11/2015 Lee ................. H04W 48/16
                                                455/41.2

* cited by examiner

*Primary Examiner* — Chuck Huynh
(74) *Attorney, Agent, or Firm* — Eversheds Sutherland (US) LLP

(57) ABSTRACT

Embodiments of the present disclosure can include methods, devices and systems for unified information to be carried in P2P discovery, NAN discovery, BLE discovery and NFC discovery that enable two devices to set up a data session either over a P2P link or over an AP infrastructure link. Certain embodiments can be used or extended to any other out-of-band Wi-Fi or Wireless Gigabit Alliance (WiGig) Discovery.

20 Claims, 11 Drawing Sheets

| Fields | Size (Octets) | Description |
|---|---|---|
| Service Identity (SID) | 6 | Indicates the service that device provides. It is a hash value over a service name. |
| Advertisement ID | 4 | Advertisement Identifier of an instance that provides the service. |
| Service MAC Address | 6 | Indicates the interface that device provide service. For example, if the device provides Print service on the Wi-Fi Direct interface, the Service MAC address will be device address of the Wi-Fi Direct interface. |
| Network Information Mode | 1 | Bit 0+Bit 1: Connection Type<br>• 00: indicates the service is provided via P2P link<br>• 01: indicates the service is provided via AP infrastructure link<br>• 10, 11: reserved<br>Bit 2: set to 1 indicates that the Regulatory Class and Channel fields are included. Otherwise, not.<br>Bit 3: set to 1 indicates that the BSSID field is included.<br>Bit 4: set to 1 indicates that the SSID field is included.<br>Bit 5: set to 1 indicates Network ID is included.<br>Bit 6- Bit 7: reserved. |
| Regulatory class | 1 | Indicate the frequency band at which the AP/GO Group Owner is currently operating, or P2P device is listening. Global Operating Classes (Table E-5 in STD 802.11) are used here. |
| Channel | 1 | Indicate the channel number, corresponding to the indicated Regulatory Class, on which the AP/GO Group Owner is currently operating, or P2P device is listening. Global Operating Classes (Table E-5 in STD 802.11) are used here. |
| BSSID | 6 | AP or Group Owner's MAC Address. |
| SSID | 32 | SSID of the AP or Group Owner to associate with in order to be connected with the Network interface on the device. |
| Network ID | 4 | The Network ID is a portion of the IP address that is used to identify individuals or devices on a network such as a local area network or the internet. |

FIG. 6

METHODS, SYSTEMS, AND DEVICES FOR ENABLING MULTIPLE RADIO ASSISTED DISCOVERY

CROSS REFERENCE TO RELATED APPLICATION

This application is a continuation of U.S. patent application Ser. No. 15/492,241, filed Apr. 20, 2017, which is a continuation of U.S. patent application Ser. No. 14/498,795, filed Sep. 26, 2014, which claims the benefit of U.S. provisional Patent Application No. 62/038,109, filed on Aug. 15, 2014, the disclosures of which are incorporated herein by reference.

TECHNICAL FIELD

Embodiments described herein generally relate to systems, methods and devices for Wireless Fidelity (Wi-Fi) communication, and more particularly to systems, methods and devices for providing service connectivity though Wi-Fi direct communication.

BACKGROUND

A typical Wi-Fi network is deployed with control equipment known as wireless access points (APs), i.e., base stations (BSs) or hot spots. The wireless APs provide service provisioning involving physical support for wired and wireless networks, bridging and routing between network equipment, and connection and release of the connection between network equipment.

Wi-Fi direct is a technology for enabling direct communication between Wi-Fi terminals without intervention of Wi-Fi APs that support connections between Wi-Fi terminals. A Wi-Fi terminal discovers a peer Wi-Fi terminal by device discovery and detects an intended service type by service discovery, thereby establishing a connection for Wi-Fi direct communication with the peer Wi-Fi terminal.

After device discovery, the Wi-Fi terminal may determine whether the discovered peer Wi-Fi terminal supports a specific service by service discovery, for Wi-Fi direct communication. The service discovery only supports acquisition of information about service types supported by the peer Wi-Fi terminal. Therefore, even though the transmitting terminal acquires information about the services supported by the receiving terminal, it does not have knowledge of the receiving terminal's intention as to whether it will receive a specific file or service from the transmitting terminal.

After allowing a device connection with the transmitting terminal, the receiving terminal does not know information (e.g. the name, file type, and the like) about the specific file or service until it starts to receive the file or service from the transmitting terminal. If the receiving terminal does not want to receive the file or service, the receiving terminal can cancel reception of the file or service during file transmission after a Wi-Fi direct connection has already been established between the transmitting terminal and the receiving terminal.

In other words, Wi-Fi direct provides a peer-to-peer connectivity to allow users to connect their devices in an easy and convenient manner to share, show, print, and synchronize content. Wi-Fi direct devices can use probe request frame and probe response frame to discover Wi-Fi devices in the proximity, and then use P2P service discovery query/response frames to find supporting services in these devices. Once a Wi-Fi direct device finds a matching service(s) in a target peer device, the device proceeds with setting up a P2P connection with the peer device.

BRIEF DESCRIPTION OF THE DRAWINGS

FIG. 6 illustrates example service provider information (SPI) attributes, according to at least one embodiment;

DETAILED DESCRIPTION

The newly established ASP2 program extends the mechanism of Wi-Fi direct discovery to also make use of Neighbor Awareness Networking (NAN), Bluetooth Low Energy (BLE) and Near Field Communication (NFC), as well as extends Wi-Fi direct connectivity to Wi-Fi infrastructure. For example, two devices can use BLE to discover each other and then set up a data session over Wi-Fi Infrastructure.

However, to define unified information to be carried in NAN, BLE and NFC to support establishing a session on a P2P connection or AP infrastructure can be a big challenge. For instance, a BLE packet has a very short packet size limitation. The existing Wi-Fi direct services device (WFDS) discovery protocol does not provide information to set up ASP session via AP infrastructure. The existing WFDS discovery protocol cannot be used in BLE and NFC. Accordingly, there is no unified solution available.

Example embodiments of the present disclosure relate to systems, methods, and devices for unified information to be carried in P2P Discovery, NAN Discovery, BLE Discovery and NFC Discovery that enable two devices to set up a data session either over a P2P link or over an AP infrastructure link. Certain embodiments of the present disclosure can be used or extended to any other out-of-band Wi-Fi or wireless gigabit alliance (WiGig) Discovery.

Embodiments of the disclosure provide numerous technical effects and unobvious solutions over conventional methods. For example, FIG. 1 illustrates a configuration of an example system 100 to which a Wi-Fi direct peer-to-peer connection is applied and Bluetooth low energy (BLE) and NFC radio may be optionally applied according to at least one embodiment of the present disclosure.

Figure 1:
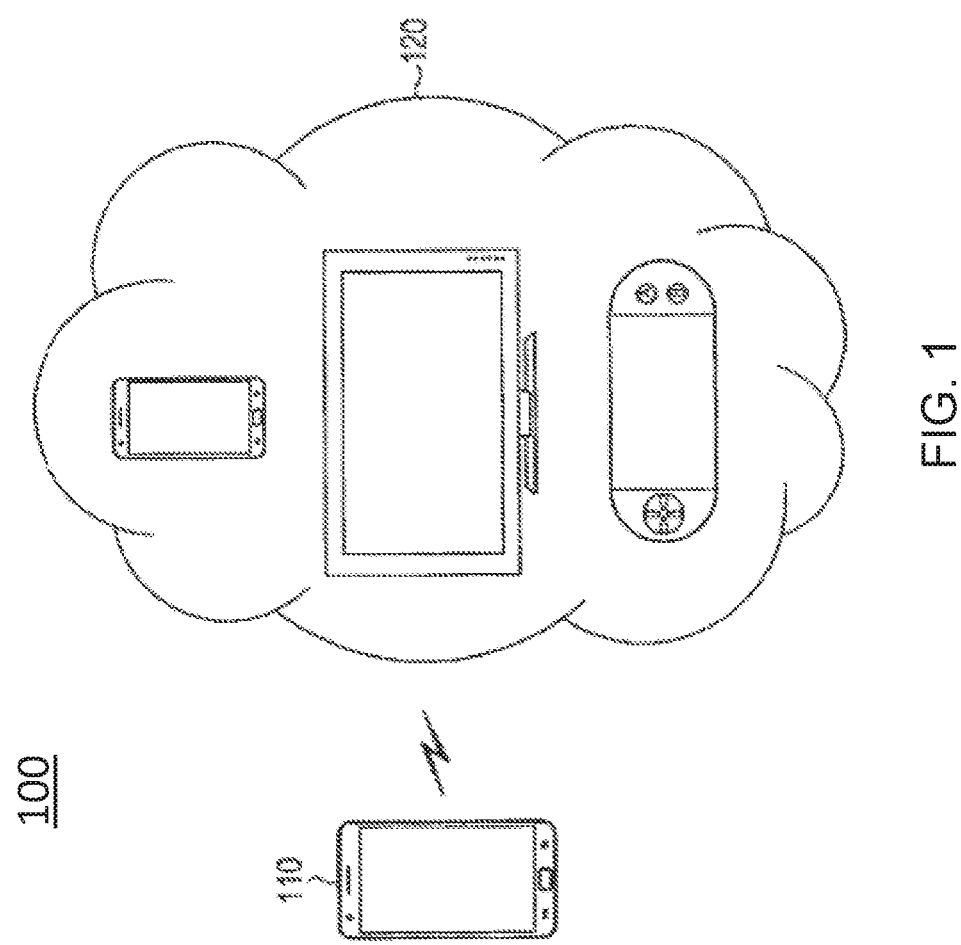
FIG. 1 illustrates a configuration of an example system to which a Wireless Fidelity (Wi-Fi) Direct connection is applied, according to at least one embodiment.

In FIG. 1, a transmitting terminal 110 and a receiving terminal 120 are shown. The transmitting terminal 110 can be a Wi-Fi terminal that may act as both a sender and a service seeker, and each of the receiving terminals 120 is a Wi-Fi terminal that may act as both a receiver and a service advertiser. For the convenience of description, the terms "transmitting terminal" and "receiving terminal" are used. One or more receiving terminals 120 may exist. For example, each of the transmitting and receiving terminals 110 and 120 can be an electronic device having a built-in Wi-Fi module, which may be any of various electronic devices operating in conformance to at least one of many communication protocols used for various communication systems, such as a mobile communication terminal, a smart phone, a tablet, a phablet, a portable multimedia player (PMP), a digital broadcasting player, a personal digital assistant (PDA), a music player, a wearable computer device, a display device, a portable game console, a printer, a camera, or the like. Additionally, each of the transmitting and receiving terminals 110 and 120 may be included in a large-size or mid-size terminal such as a television (TV), a large format display (LFD), a digital signage (DS), a media pole, a personal computer (PC), a laptop, a printer, or a composite device.

The Wi-Fi system 100 may support a Wi-Fi direct communication between the transmitting terminal 110 and a receiving terminal 120 and establish a mutual Wi-Fi connection between the transmitting terminal 110 and the receiving terminal 120 in a direct access (DA) mode. FIG. 1 also illustrates an example system configuration in which a Wi-Fi direct connection is established between the Wi-Fi terminals 110 and 120. In this system 100, the Wi-Fi terminals 110 and 120, which are in proximity to each other, may establish a Wi-Fi direct connection with each other using their built-in Wi-Fi modules or Wi-Fi modules connected to them as periphery devices without the aid of an AP.

The Wi-Fi terminals 110 and 120 may exchange information about their supported functions with each other. For example, when a user executes a Wi-Fi service-based application in the transmitting terminal 110, the transmitting terminal 110 can identify the supported function information received from the receiving terminal(s) 120. The transmitting terminal 110 may primarily select one or more receiving terminals 120 according to a predetermined criterion, for example, one or more receiving terminals 120 of the same manufacturer as that of the transmitting terminal 110, referring to the supported function information. If one or more receiving terminals 120 are selected, the transmitting terminal 110 may secondarily select a terminal supporting the Wi-Fi service of the application executed in the transmitting terminal 110 from among the primarily selected terminals. If one or more receiving terminals 120 are secondarily selected, the transmitting terminal 110 may select the best receiving terminal 120 for the Wi-Fi service according to the signal qualities, for example, signal strengths of the secondarily selected receiving terminals. The transmitting terminal 110 may request execution of a related application to the best receiving terminal 120 by transmitting information about the executed application.

While the system 100 illustrated in FIG. 1 is configured to establish a Wi-Fi direct connection between the Wi-Fi terminals 110 and 120 in FIG. 1, embodiments of the present disclosure are not limited to Wi-Fi direct connectivity. Specifically, certain embodiments of the present disclosure can be applicable to instances where the Wi-Fi terminals 110 and 120 use wireless local area network (WLAN) and instances where the Wi-Fi terminals 110 and 120 are connected through an AP.

Figure 2:
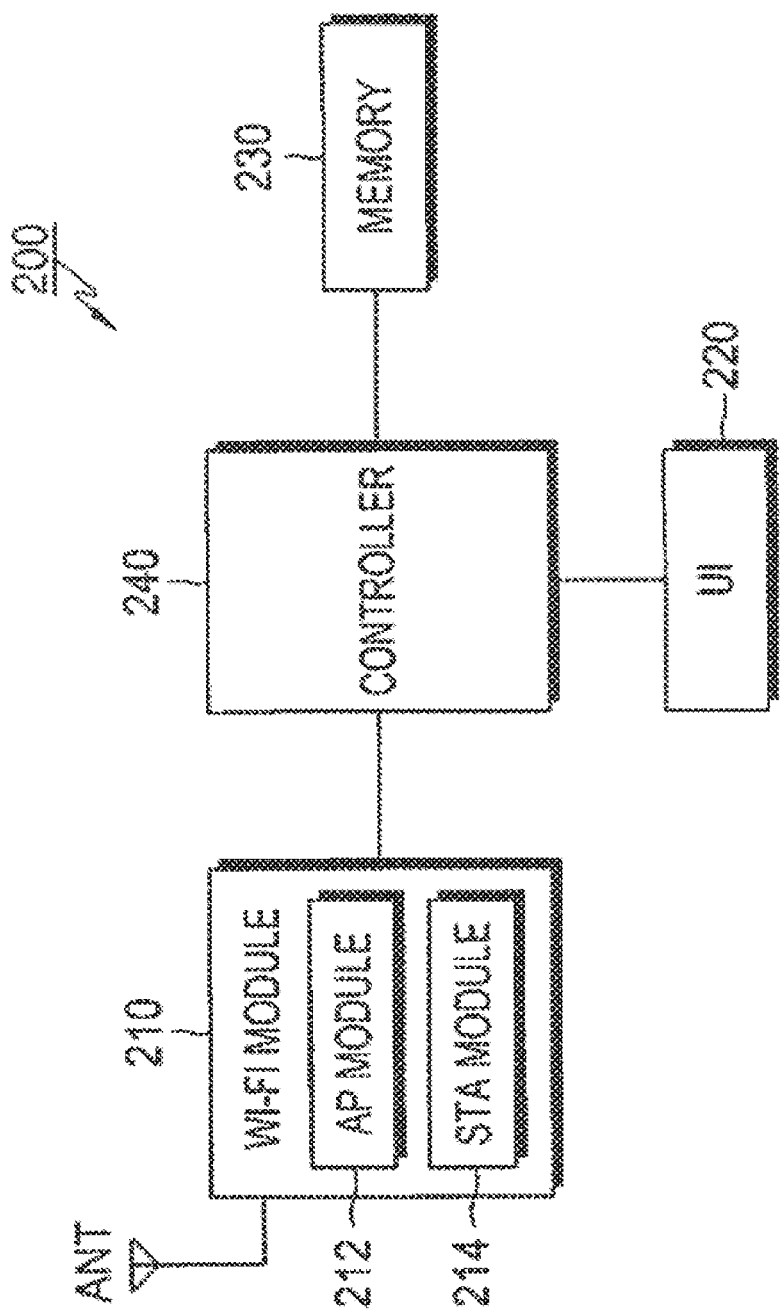
FIG. 2 is a block diagram of an example Wi-Fi terminal, according to at least one embodiment.

FIG. 2 is a block diagram illustrating an example structure of a Wi-Fi terminal 200 according to at least one embodiment of the present disclosure. The Wi-Fi terminal structure is applicable commonly to the above described transmitting and receiving terminals 110 and 120.

In the embodiment described in FIG. 2, the Wi-Fi terminal 200 can include a Wi-Fi module 210, a user interface (UI) 220, a memory 230, and a controller 240. Besides the components, the Wi-Fi terminal 200 may further include other various components according to its configuration. For example, the Wi-Fi terminal 200 may further include at least one of a display to display a screen, a radio frequency (RF) module to perform a mobile communication function, an audio processor with a microphone and a speaker, a camera module to take a picture, a digital broadcasting module, and/or a Bluetooth communication module to perform a Bluetooth communication function, and/or a NFC communication module to perform a NFC communication function, which are recognized components by those skilled in the art.

The Wi-Fi module 210 can support internet protocol (IP)-based wireless communication between Wi-Fi terminals. The Wi-Fi module 210 can include at least one of an AP module 212 and a station (STA) module 214. The Wi-Fi module 210 may operate in an AP mode by waking up the AP module 212 or in a non-AP mode (i.e. an STA mode) by waking up the STA module 214 under the control of the controller 240. The non-AP mode (i.e. the STA mode) can refer to a mode in which the Wi-Fi terminal functions as a terminal in providing a Wi-Fi service. For example, the non-AP mode may be a mode in which the Wi-Fi terminal 200 functions as the transmitting terminal 110 as described before with reference to FIG. 1. The AP mode refers to a mode in which the Wi-Fi terminal 200 functions as an AP in providing a Wi-Fi service.

When the Wi-Fi terminal 200 operates as a sender, the Wi-Fi module 210 can transmit information about attributes of a file to be transmitted under the control of the controller 240 during the establishment of a Wi-Fi direct connection with a peer Wi-Fi terminal. The file attribute information can be used to exchange service information before a connection is established between the Wi-Fi terminals. The file attribute information may be provided to give a hint to the peer Wi-Fi terminal as to whether incoming of a service session is to be accepted or rejected. For example, in the case of a transmission service of at least one file or content, the file attribute information may include at least one of a note(s) containing information relating to the file(s), the total size of the file(s), the number of files, and the name(s) of the file(s).

When the Wi-Fi terminal 200 operates as a receiver, the Wi-Fi module 210 can receive file attribute information about a file to be transmitted by the peer Wi-Fi terminal during establishing a Wi-Fi direct connection with the peer Wi-Fi terminal and provides the received file attribute information to the controller 240. The controller 240 can provide the file attribute information to a user of the Wi-Fi terminal 200 and asks the user whether the at least one file corresponding to the file attribute information should be received.

The UI 220 can sense a user's manipulation, generate an input signal corresponding to the sensed user's manipulation, provide the input signal to the controller 240, and display or otherwise output information for the user under the control of the controller 240. For some or all of these purposes, the UI 220 may include at least one of one or more logical or physical buttons, a display, a touch screen, a gesture sensing module, a speaker, and/or a microphone. More particularly, the UI 220 may include one or more input devices and/or techniques to generate a user input signal related to execution of a Wi-Fi function for a Wi-Fi service, for example, a user input signal related to initiation of a connection setup between Wi-Fi terminals, selection of a file to be transmitted, or acceptance or rejection of file transmission. In addition, the UI 220 may include an output device and/or technique to display information about a file to be received.

The memory 230 can store program codes and data that are executed and processed in the Wi-Fi terminal 200. The memory 230 may include one or more volatile memory devices and/or one or more non-volatile memory devices. For example, the memory 230 may permanently or temporarily store an operating system (OS) of the Wi-Fi terminal 200, information and data exchanged through the Wi-Fi module 210, at least one file to be transmitted, and information about the at least one file.

The controller 240 can facilitate overall control of the Wi-Fi terminal 200. The controller 240 can control operations related to execution of functions used to provide a Wi-Fi service in the Wi-Fi terminal 200. The controller 240 may also control operations related to a file transmission service in the Wi-Fi terminal 200. Specifically, the controller 240 can generate file attribute information about a file to be transmitted based on the file itself and/or a user input or retrieves the file attribute information from the memory 230, and control the Wi-Fi module 210 to transmit the file attribute information to the peer terminal. In addition, the controller 240 can interpret received file attributed information about a file to be received from the peer Wi-Fi terminal, output the file attribute information through the UI 220, and receive information about a user intention from the UI 220. If the user does not accept the file transmission, the controller 240 can command the Wi-Fi module 210 to discontinue setup of a Wi-Fi direct connection with the peer Wi-Fi terminal.

Operations of the controller 240 according to certain embodiments of the present disclosure will be described below. Besides the above-described operations, the controller 240 can perform control operations related to typical functions of the Wi-Fi terminal 200. For example, the controller 240 may control a communication function using a mobile communication network, when an application is executed based on the communication function. When an application having a communication function is executed, the controller 240 may also control the communication function.

Figure 3:
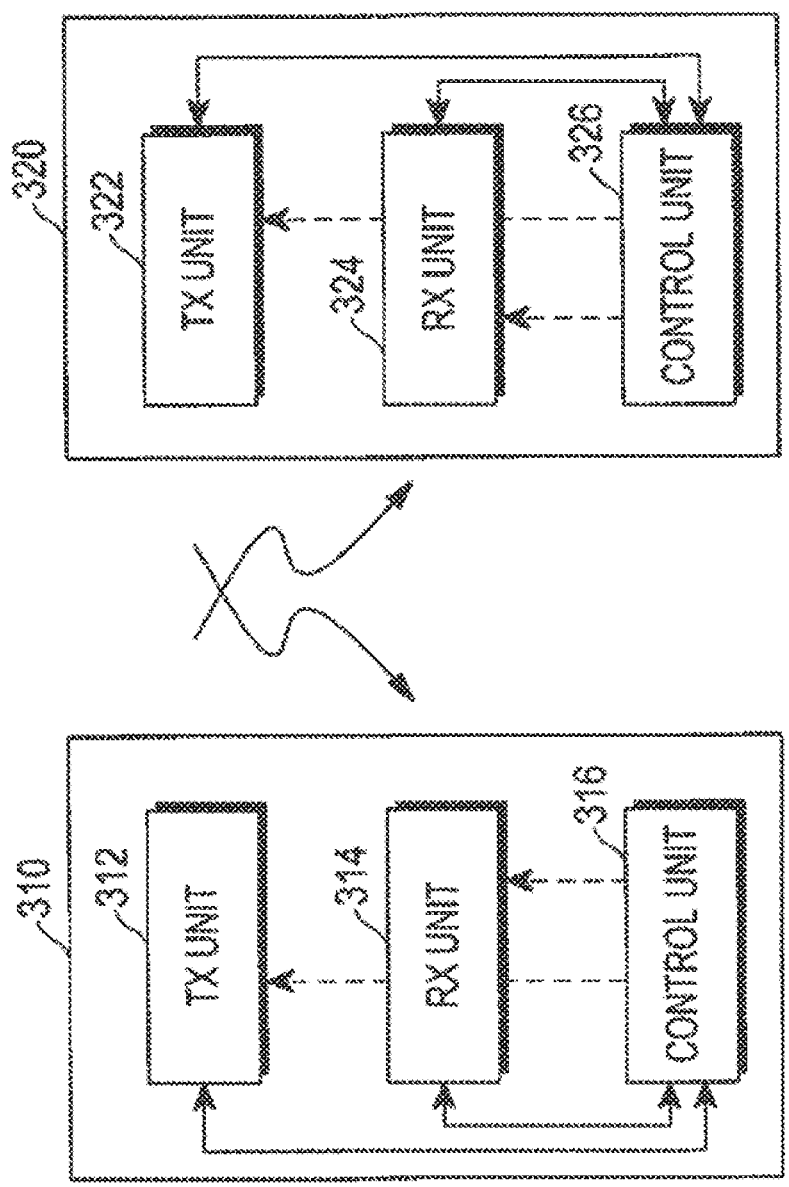
FIG. 3 is a block diagram of an example transmitting terminal and a receiving terminal, according to at least one embodiment.

FIG. 3 is a block diagram of an example transmitting terminal and receiving terminal according to at least one embodiment of the present disclosure. In FIG. 3, within a transmitting terminal 310, a transmitting unit 312 can transmit, in a predetermined message or frame, file attribute information about a file to be transmitted by the transmitting unit 312 to a receiving terminal 320 during Wi-Fi direct connection setup or Wi-Fi AP connection setup. The message or frame may be a message available for a Wi-Fi direct service, for example, a genetic advertisement service (GAS) initial request action frame or a Peer-to-Peer (P2P) public action frame.

A receiving unit 314 can receive information about a user intention as to whether a user of the receiving terminal 320 will accept or reject file transmission. The user intention information may be transmitted, for example, in a GAS initial request action frame or a P2P public action frame.

A control unit 316 can determine, based on the user intention information received from the receiving terminal 320, whether to continue or discontinue the Wi-Fi connection setup with the receiving terminal 320.

In the receiving terminal 320, a receiving unit 324 can receive from the transmitting terminal 310 file attribute information about a file to be transmitted by the transmitting terminal 310. A transmitting unit 322 can transmit information about the user intention as to whether the user of the receiving terminal 320 will accept or reject the file transmission to the transmitting terminal 310 under the control of a control unit 326. The control unit 326 can ask the user whether the transmission service from the transmitting terminal 310 should be accepted based on the received file attribute information, and can generate and transmit the user intention information to the transmit unit 322.

The control unit 326 may determine, based on the user intention information, whether to continue or discontinue the Wi-Fi direct connection setup with the transmitting terminal 310.

Certain embodiments of the present disclosure can be directed to techniques for making a wireless direct service, referred to as a Wi-Fi direct Service (WFDS), available using an application service platform (ASP).

Figure 4:
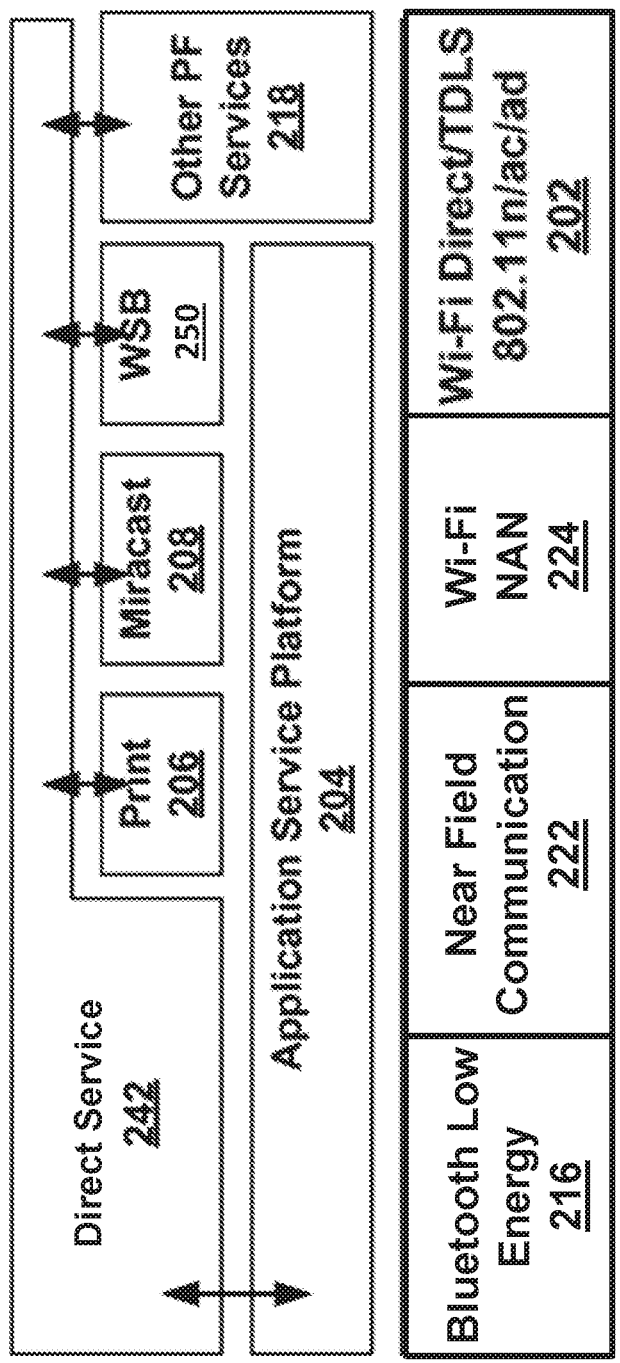
FIG. 4 is a block diagram illustrating an example interface between a wireless service, an application service platform (ASP), and other services, according to at least one embodiment.

Certain technical effects or solutions can be accomplished by certain embodiments of the disclosure, for example, FIG. 4 is a block diagram illustrating an example interface between a direct service, an application service platform (ASP), and other services according to at least one embodiment of the present disclosure. In the example of FIG. 4, direct service 242 may be a direct service offered by a wireless device A, such as for example a service advertiser. The service advertiser can be built on Wi-Fi direct Service (WFDS) 202 and application service platform (ASP) 204, which can enable direct service 242 at a wireless device B, such as for example a service seeker or subscriber, to wirelessly connect to the service advertiser and manage the use of peripheral function services that are associated with the service advertiser. The peripheral function services may or may not be on ASP in various examples. In this manner, FIG. 4 illustrates an example interface between Wi-Fi direct Service 242, ASP 204, and other services.

The interface between direct service 242 at the service advertiser and ASP 204 may allow direct service 242 at a service advertiser to perform some or all of the following services. First, the interface between the service advertiser and ASP 204 can allow direct service 242 to advertise direct service 242 at the service advertiser, such as peripheral functions that direct service 242 manages, and the capabilities required to drive the use of the peripheral functions of direct service 242. The interface between the service advertiser and ASP 204 can also allow direct service 242 to enable a service seeker or subscriber to wirelessly connect to the service advertiser and manage the use of peripherals that are associated with the service advertiser through a direct session.

The interface between direct service 242 at the service seeker or subscriber and ASP 204 can allow direct service 242 at a service seeker or subscriber to seek direct service 242 at a service advertiser, including peripheral functions the service advertiser manages and capabilities needed to drive the use of the peripheral functions of the service advertiser. The interface between direct service 242 at the service seeker or subscriber and ASP 204 can also allow direct service 242 at a service seeker or subscriber to wirelessly connect to the service advertiser and manage the use of peripherals that are associated with the service advertiser through a direct session.

The interface between direct service 242 at the service advertiser can allow direct service 242 at the service advertiser to perform additional functionality. As an example, the interface between direct service 242 and other services may allow direct service 242 to control the service seeker or subscriber's access to other services at the service advertiser. As another example, the interface between direct service 242 and other services may allow direct service 242 to control the functions provided by another service at the service advertiser in order to provide differentiated services to different service seeker or subscribers.

Additionally, the interface between direct service 242 at the service seeker or subscriber and other services, such as print service 206, Miracast service 208, Wi-Fi serial bus (WSB) 250, and other peripheral services 218 can allow direct service 242 at the service advertiser to trigger another service at the service seeker or subscriber to seek and use the corresponding service at a service advertiser.

Figure 5:
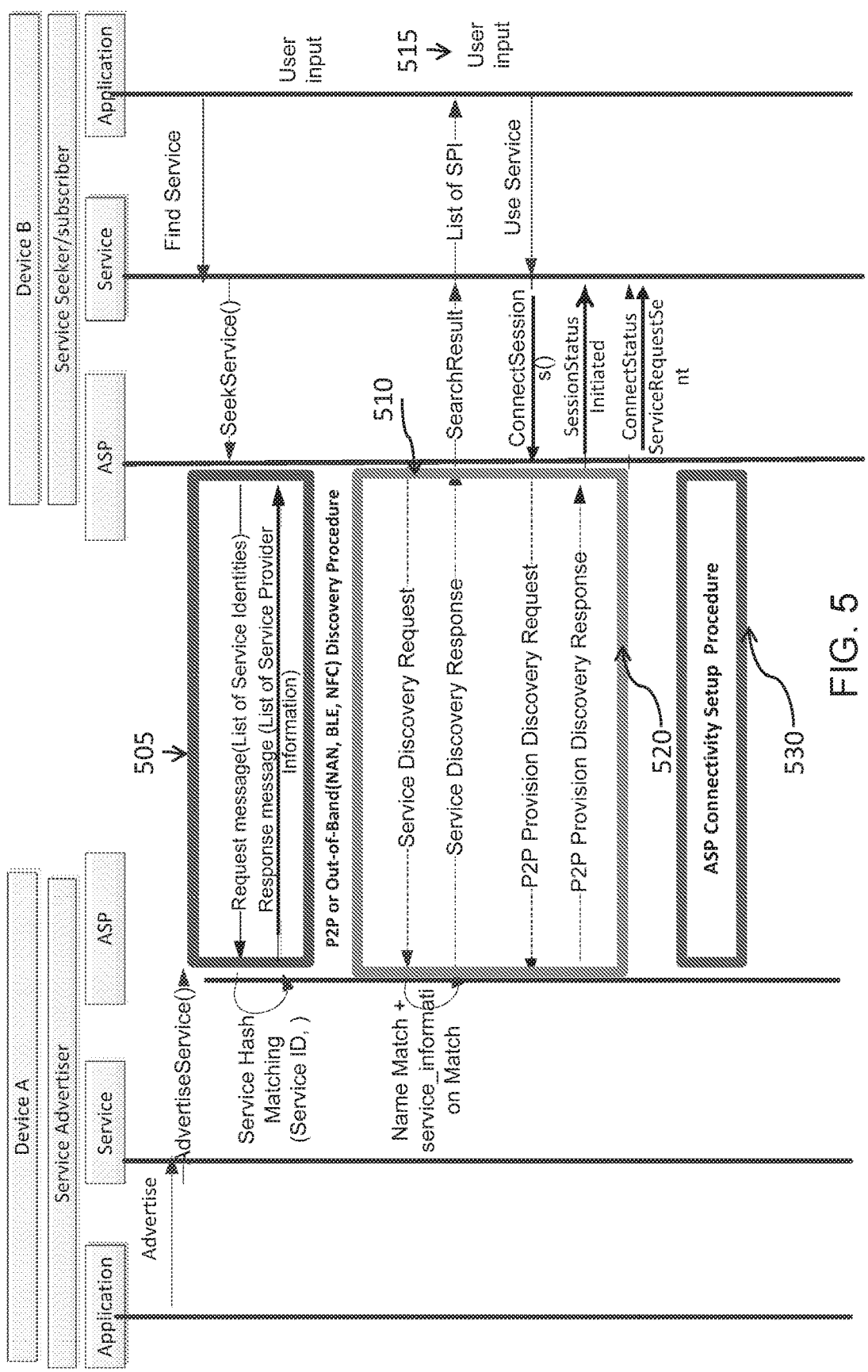
FIG. 5 is a flow diagram illustrating an example call flow of a Wi-Fi direct connection or service session setup, according to at least one embodiment.

FIG. 5 is a flow diagram illustrating an example call flow of a Wi-Fi direct connection or service session setup, according to one or more embodiments of the present disclosure. In FIG. 5, terminal A (i.e., Device A) can act as a service advertiser and terminal B (i.e., Device B) can act as a service seeker or subscriber. In a file transmission service, terminal A is a receiving terminal and terminal B is a transmitting terminal. A connection can be established between terminal A and terminal B through Wi-Fi P2P interfaces or AP interface.

As shown in FIG. 5, in terminal A, a service process can advertise a service(s) to an ASP by an AdvertiseService command so that another terminal, for example, terminal B may discover an ASP session related to the advertised service(s) and be initialized. When an application is executed and a service use command is generated to transmit a specific file in terminal B, a service process of terminal B can transmit a SeekService command requesting service discovery to an ASP of terminal B. In response to the command, the ASP of terminal B can transmit a P2P Probe Request with a hash value generated based on a service name to the ASP of terminal A in operation 505. In other words, the seeker can send a request message with a list of service identities, for example, in operation 505.

The ASP of terminal A can judge whether the hash value of the service name to be advertised is matched to the hash value received in the P2P probe request. If the hash values are matched, the ASP of terminal A can transmit a P2P probe response to the ASP of terminal B. The P2P probe response may include the service name confirmed by hash matching and the advertisement ID of the service to be advertised from terminal A. In other words, the service advertiser can send a response message to the seeker with a list of service providers' information.

In operation 510, the ASP of terminal B can transmit the service name to be connected and a service information request, including additional information needed for service discovery, to terminal A through a P2P service discovery request. The ASP of terminal A can determine whether there is a string matched to the service name and service information received in the P2P service discovery request. Upon detection of the matched string, the terminal A can transmit a P2P service discovery response including the name and advertisement ID of the service and a service status to the terminal B. The service status may indicate whether the terminal A accepts connection of the service.

The ASP of terminal B can transmit, to the service process, a terminal list including at least one terminal, including the terminal A identified by the P2P service discovery response. The service process can indicate the terminal list to a user by the application. In operation 515, the application can sense a user input that selects at least one terminal in the terminal list and notify the service process of the selected terminal. The service process can request a session connection setup with the selected terminal to the ASP of terminal B.

In operation 520, the ASP of terminal B can transmit a P2P provision discovery request including session information, which can represent file attribute information about one or more files to be transmitted and connection capabilities, to the ASP of terminal A and can also transmit a ConnectStatus event indicating transmission of a service request to the service process of terminal B. The P2P provision discovery request can include at least one of the number, total size, and names of the file(s), as the file attribute information. The ASP of terminal A may transmit to the ASP of terminal B a P2P provision discovery response indicating successful reception of the P2P provision discovery request, which can include a status code that requests deferral of a service request until a user input is confirmed. The ASP of terminal B can transmit a ConnectStatus event indicating deferral of the service request to the service process. The service process of terminal B can recognize deferral of the service request until a user intention of terminal A is confirmed and can activate a timer in response to the ConnectStatus event. The timer may be reset when a P2P provision discovery request, indicating the user intention, is received from terminal A.

The ASP of terminal A can notify the service process of the session request in response to the P2P provision discovery request received from terminal B. When needed, the service process of terminal A can activate an application of the Wi-Fi direct service and can transmit session information with the file attribute information to the application.

In certain embodiments, an additional operation may be executed, wherein the application of terminal A can request a user input by displaying information about the files on a screen based on the file attribute information read from the session information. Upon detection of a user input indicating acceptance of the file transmission service, the application can notify the service process of the user acceptance and the service process can transmit a SessionConfirm command indicating confirmation of a session setup to the ASP of terminal A. When transmitting the session information to the application, the service process of terminal A may activate a timer. When a user input is received, the timer may be reset. In another embodiment of the present disclosure, if a user input has not been detected before expiration of the timer, the service process of terminal A may transmit a SessionConfirm command indicating acceptance of the file transmission service according to a presetting in the ASP.

In operation 530, the ASP of terminal A can transmit a P2P provision discovery request including a status code indicating acceptance and, when needed, the session information to the ASP of terminal B in response to the SessionConfirm command received from the service process. The ASP of terminal B can provide a ConnectStatus event indicating acceptance of the service request to the service process and continuously perform the remaining operations of the session setup procedure.

As shown in FIG. 6, for example, the service identity (SID) can be a 6 octet hash value of the service name. It should be noted, however, that service hash and service identity are defined and used in the Wi-Fi Alliance WFDS technical specification. Service identity can be carried in the request message, as described above. According to one or more embodiments, service provider information (SPI) attribute may include a set of data points for the API interface that provides the corresponding service. The SPI attribute can be carried in the response message or unsolicited advertisement. The SPI attribute can include information, such as for example, a service ID which may indicate the service that the device may provide, an advertisement ID which may indicate an advertisement identifier of an instance that may provide the service, and/or a service media access control (MAC) address which may indicate the interface used by the device to provide service. For example, if the device provides a print service on the Wi-Fi direct interface, then the service MAC address may be the device address of the Wi-Fi direct interface. The SPI attribute may include additional information, such as for example, a network information mode, which may be conveyed using bit information. For example, Bit 0 and Bit 1 may convey a connection type, in that 00 may indicate the service is provided via a P2P link, while 01 may indicate the service is provided via AP infrastructure link, and 10, 11 may indicate that the network is reserved. Similarly, Bit 2 may indicate that the regulatory class and channel fields are included; Bit 3 may indicate that the basic service set identification (BSSID) field is included; Bit 4 may indicate that the service set identification (SSID) field is included; Bit 5 may indicate that the network ID is included; and Bits 6 and 7 may indicate that the network is reserved. The SPI attribute may include additional information, such as for example, a regulatory class, channel information, BSSID, SSID, and/or a network ID. A regulatory class may indicate the frequency band at which the AP/group owner may be currently operating or the P2P device may be listening, for example. Channel information may indicate the channel number corresponding to the indicated regulatory class on which the AP/group owner may be currently operating, or the P2P device may be listening. BSSID may refer to AP's or group owner's MAC address, for example, SSID may refer to SSID of the AP's or group owner's to associate with in order to be connected with the network interface of the device, and network ID may refer to a portion of the IP address that is used to identify devices on a network such as a local area network or the Internet. The length of SPI attribute can vary from 17 octets to 79 octets. However, if the SPI is included in a BLE packet, the first 19 octets can be recommended to be included due to BLE packet length constraints. In other words, the length of a BLE adverting payload can be up to 27 octets: 5 bytes can be overhead and up to 22 bytes can be available for SIG/SDO use.

In general, the discovery procedure can include a seeker transmitting a request message including a list of service identities, and an advertiser transmitting a response message including a list of service provider information in response to the request message. An advertiser can also transmit an advertisement message (unsolicited response) that can include a list of service provider information, for example. If multiple service provider information attributes for a service are available, the order in which the list of service provider information is included in the frame can indicate the corresponding order of preference. That is, the higher in priority, the earlier in the list of the service, for example. Once the Seeker receives service provider information, the seeker can proceed with service discovery (optional, can be either P2P link or AP infrastructure), P2P provision discovery (optional, only applied to an ASP session over P2P link), and establish an ASP session over corresponding network link that is provided in the service provider information, for example.

Figure 7:
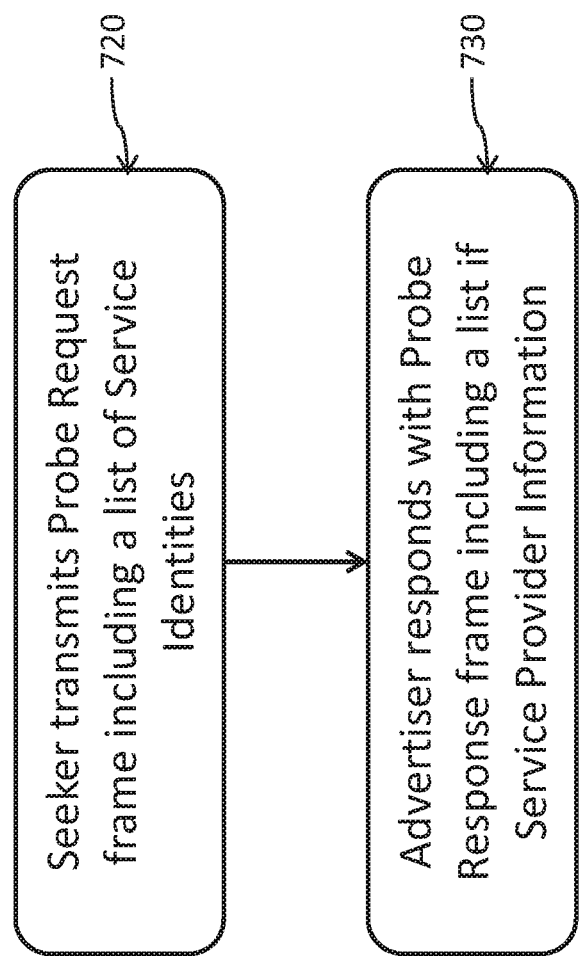
FIG. 7 is a flowchart illustrating an example method for discovery via a P2P discovery, according to at least one embodiment.

Turning now to FIG. 7, a flow diagram showing operations in an example discovery process via P2P discovery, according to one or more embodiments of the present disclosure. As shown in FIG. 7, in operation 720, a seeker can transmit probe request frame including a list of service identities, for example. In operation 730, an advertiser can respond with probe response frame including a list if service provider information, for example.

Figure 8:
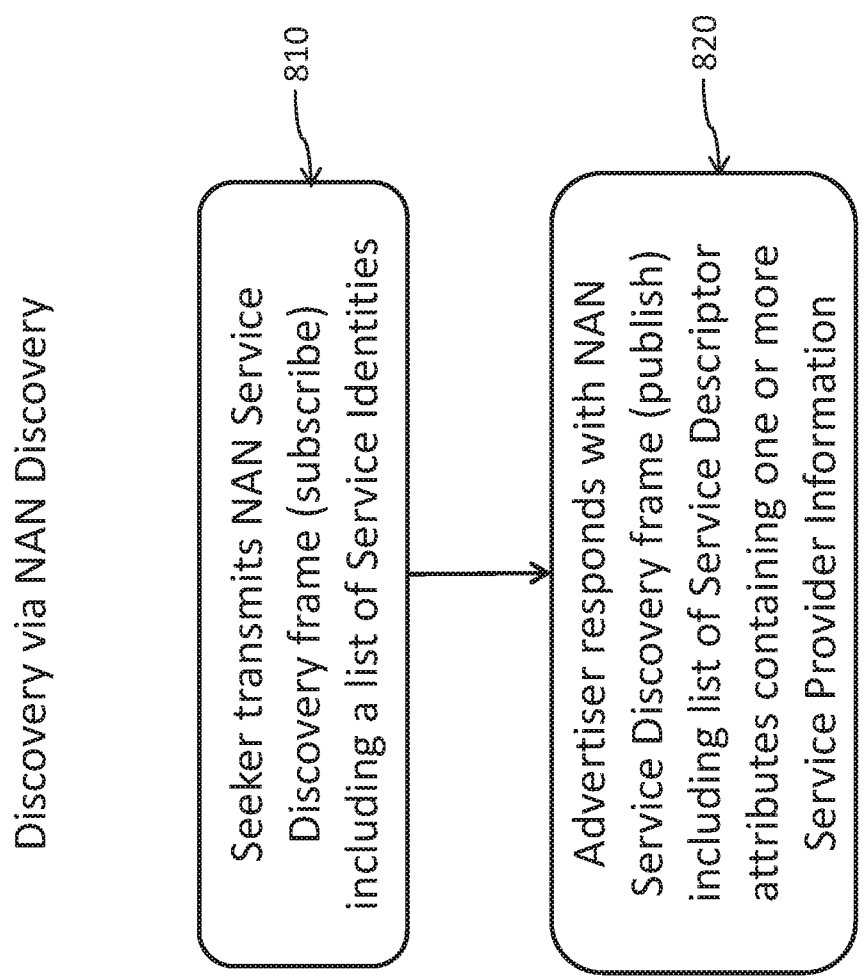
FIG. 8 is a flowchart illustrating an example method for discovery via a NAN discovery, according to at least one embodiment.

FIG. 8 illustrates a flow diagram showing operations in an example discovery process via NAN discovery, according to one or more embodiments of the present disclosure. As shown in FIG. 8, in operation 810, a seeker can transmit NAN service discovery frame (subscribe) including a list of service identities, for example. In operation 820, an advertiser can respond with NAN service discovery frame (publish) including a list of service descriptor attributes containing one or more service provider information, for example.

Figure 9:
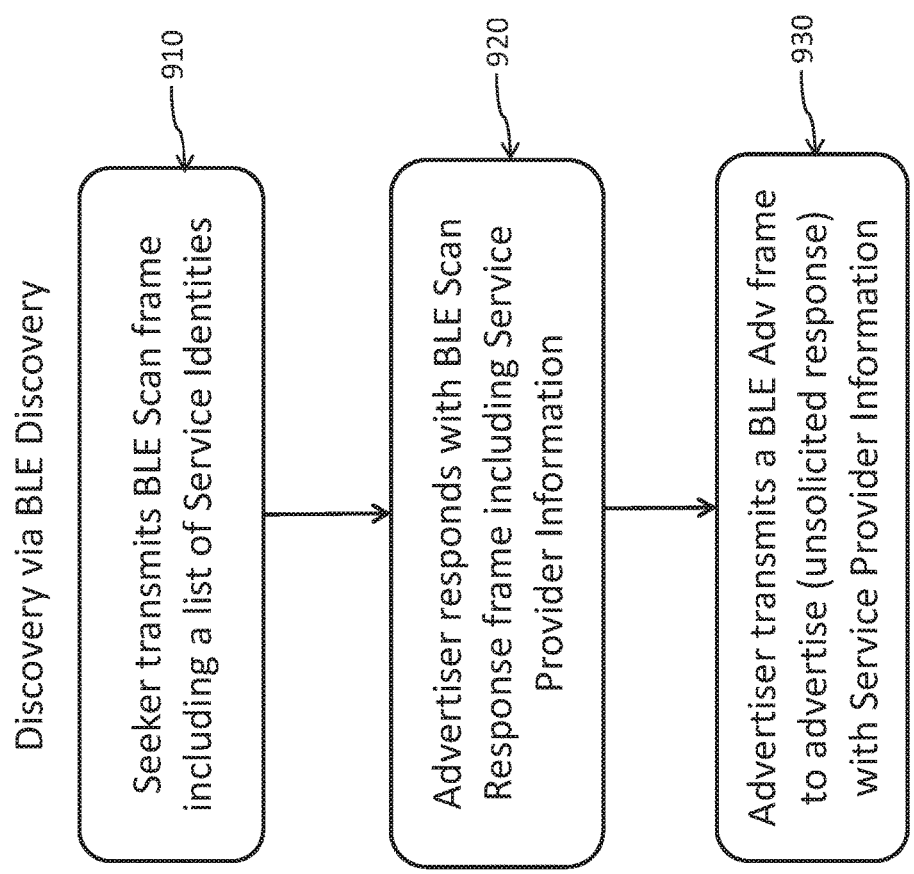
FIG. 9 is a flowchart illustrating an example method for discovery via a BLE discovery, according to at least one embodiment.

FIG. 9 illustrates a flow diagram showing operations in an example discovery process via BLE discovery, according to one or more embodiments of the present disclosure. As shown in FIG. 9, in operation 910, a seeker can transmit a BLE scan frame including a list of service identities, for example. In operation 920, an advertiser can respond with a BLE scan response frame including service provider information, for example. In operation 930, advertiser can transmit a BLE Adv frame to advertise (unsolicited response) with service provider information, for example.

Figure 10:
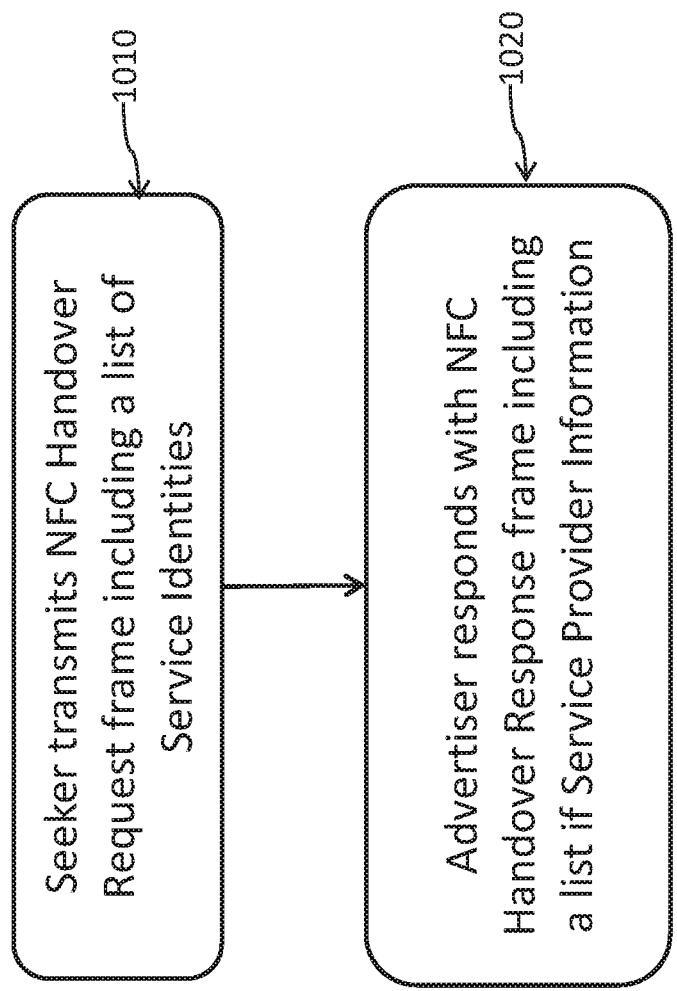
FIG. 10 is a flowchart illustrating an example method for discovery via a NFC discovery, according to at least one embodiment.

Turning now to FIG. 10, a flow diagram is illustrated showing operations in an example discovery process via NFC discovery, according to one or more embodiments of the present disclosure. As shown in FIG. 10, in operation 1010, a seeker can transmit NFC handover request frame including a list of service identities, for example. In operation 1020, an advertiser can respond with a NFC handover response frame including a list if service provider information, for example.

Certain technical effects or solutions can be accomplished by certain embodiments of the disclosure, for example, embodiments disclosed herein can provide data that needs to be processed at the application/service level in the context of what the application/service accomplishes in order to determine how to connect to the discovered device so that the resulting user experience is the best, for example. Example embodiments disclosed herein may reduce the number of management frames used by Wi-Fi for device/service discovery, extend battery life due to the use of low power discovery mechanisms, and enable faster discovery and as a result faster ASP session establishment, for example. It should be appreciated that the above examples of technical effects and/or solutions of the present disclosure are merely illustrative and that numerous other technical effects and/or solutions may exist.

Figure 11:
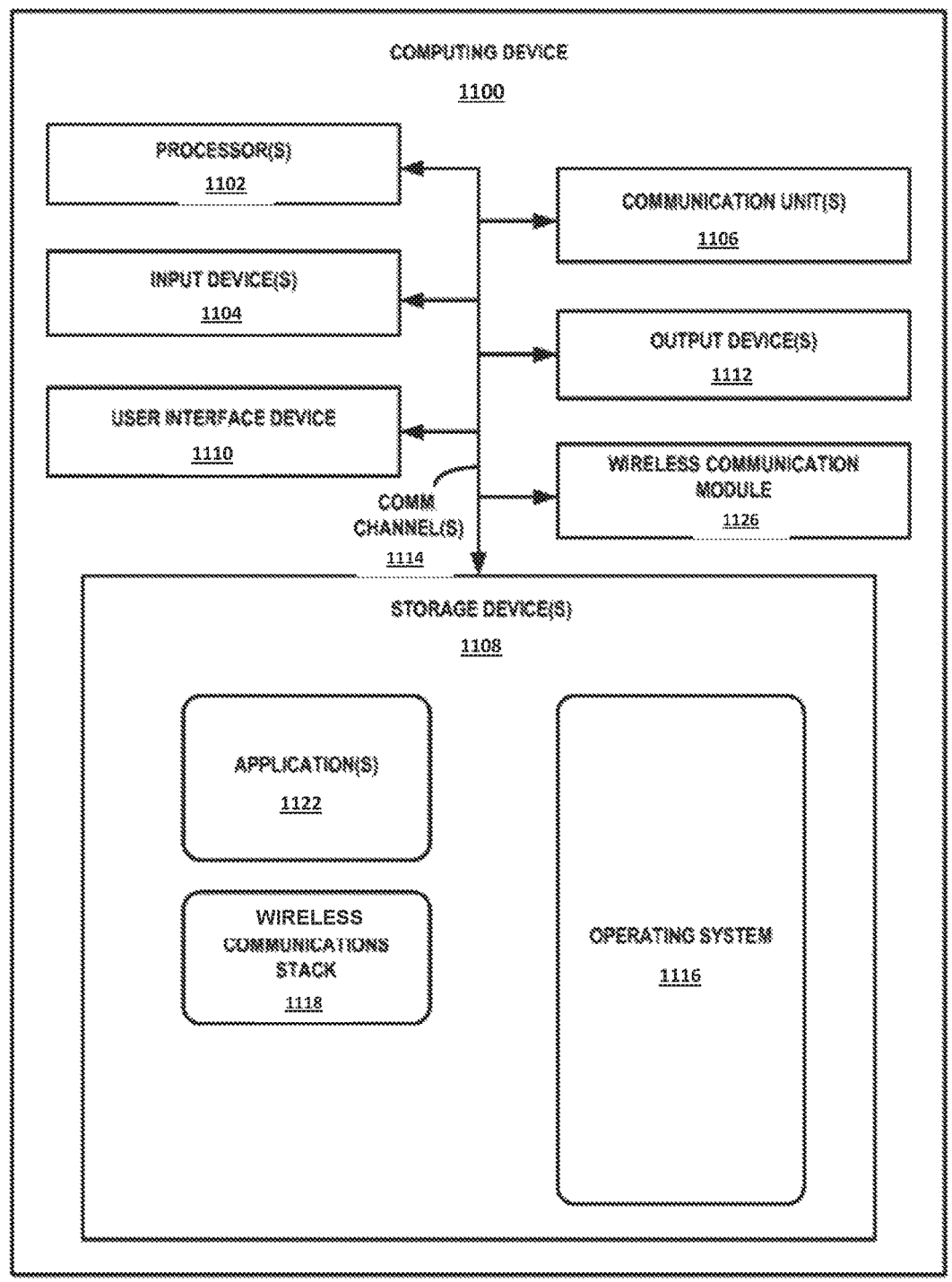
FIG. 11 is a block diagram illustrating an example instance of a computing device operating according to at least one embodiment.

FIG. 11 is a block diagram illustrating an example instance of a computing device 1100 operating according to methods in accordance with one or more embodiments of the present disclosure. FIG. 11 illustrates only one particular example of computing device 1100, and other examples of computing device 1100 may be used in other instances. Although shown in FIG. 11 as a stand-alone computing device 1100 for purposes of example, a computing device may be any component or system that includes one or more processors or other suitable computing environment for executing software instructions and, for example, need not necessarily include one or more elements shown in FIG. 11 (e.g., input devices 1104, user interface devices 1110, output devices 1112).

As shown in the specific example of FIG. 11, computing device 1100 can include one or more processors 1102, one or more input devices 1104, one or more communication units 1106, one or more output devices 1112, one or more storage devices 1108, and user interface (UI) device 1110, and wireless communication module 1126. Computing device 1100, in one example, further includes wireless communications stack 1118, authorization module (not shown), one or more applications 1122, and operating system 1116 that are executable by computing device 1100. Each of components 1102, 1104, 1106, 1108, 1110, 1112, and 1126 are coupled (physically, communicatively, and/or operatively) for inter-component communications. In some examples, communication channels 1114 may include a system bus, a network connection, an inter-process communication data structure, or any other method for communicating data. As one example in FIG. 11, components 1102, 1104, 1106, 1108, 1110, 1112, and 1126 may be coupled by one or more communication channels 1114. Wireless communications stack 1118, authorization module 1120, and one or more applications 1122 may also communicate information with one another as well as with other components in computing device 1100. While illustrated as separate modules, any one or more of modules 1118 or 1120 may be implemented as part of any of applications 1122.

Processors 1102, in one example, are configured to implement functionality and/or process instructions for execution within computing device 1100. For example, processors 1102 may be capable of processing instructions stored in storage device 1108. Examples of processors 1102 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1108 may be configured to store information within computing device 1100 during operation. Storage device 1108, in some examples, is described as a computer-readable storage medium. In some examples, storage device 1108 is a temporary memory, meaning that a primary purpose of storage device 1108 is not long-term storage. Storage device 1108, in some examples, is described as a volatile memory, meaning that storage device 1108 does not maintain stored contents when the computer is turned off. Examples of volatile memories include random access memories (RAM), dynamic random access memories (DRAM), static random access memories (SRAM), and other forms of volatile memories known in the art. In some examples, storage device 1108 is used to store program instructions for execution by processors 1102. Storage device 1108, in one example, is used by software or applications running on computing device 1100 to temporarily store information during program execution.

Storage devices 1108, in some examples, can also include one or more computer-readable storage media. Storage devices 1108 may be configured to store larger amounts of information than volatile memory. Storage devices 1108 may further be configured for long-term storage of information. In some examples, storage devices 1108 can include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1100, in some examples, can also include one or more communication units 1106. Computing device 1100, in one example, can utilize communication unit 1106 to communicate with external devices via one or more networks, such as one or more wireless networks. Communication unit 1106 may be a network interface card, such as an Ethernet card, an optical transceiver, a radio frequency transceiver, or any other type of device that can send and receive information. Other examples of such network interfaces may include Bluetooth, 7G and Wi-Fi radios computing devices as well as universal serial bus (USB). In some examples, computing device 1100 can utilize communication unit 1106 to wirelessly communicate with an external device such as a server.

In addition, the computing device 1100 may include wireless communication module 1126. As described herein, wireless communication module 1126 may be active hardware that is configured to communicate with other wireless communication devices. These wireless communication devices may operate according to Bluetooth, Ultra-Wideband radio, Wi-Fi, or other similar protocols. In some examples, wireless communication module 1126 may be an external hardware module that is coupled with computing device 1100 via a bus (such as via a universal serial bus (USB) port). Wireless communication module 1126, in some examples, may also include software which may, in some examples, be independent from operating system 1116, and which may, in some other examples, be a sub-routine of operating system 1116.

Computing device 1100, in one example, also includes one or more input devices 1104. Input device 1104, in some examples, is configured to receive input from a user through tactile, gesticular, audio, or video feedback. Examples of input device 1104 include a presence-sensitive display, a mouse, a keyboard, a voice responsive system, video camera, gesture detection and/or capture device, microphone or any other type of device for detecting a command from a user.

One or more output devices 1112 may also be included in computing device 1100. Output device 1112, in some examples, is configured to provide output to a user using tactile, audio, or video stimuli. Output device 1112, in one example, can include a presence-sensitive display, a sound card, a video graphics adapter card, or any other type of device for converting a signal into an appropriate form understandable to humans or machines. Additional examples of output device 1112 can include a speaker, a cathode ray tube (CRT) monitor, a liquid crystal display (LCD), or any other type of device that can generate intelligible output to a user. In some examples, user interface (UI) device 1110 may include functionality of input device 1104 and/or output device 1112.

Computing device 1100 may include operating system 1116. Operating system 1116, in some examples, can control the operation of components of computing device 1100. For example, operating system 1116, in one example, can facilitate the communication of wireless communications stack 1118, and application 1122 with processors 1102, communication unit 1106, storage device 1108, input device 1104, user interface device 1110, wireless communication module 1126, and output device 1112. Wireless communications stack 1118 and application 1122 may also include program instructions and/or data that are executable by computing device 1100. As one example, modules 1118, 1120, and 1122 may include instructions that cause computing device 1100 to perform one or more of the operations and actions described in the present disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the methods described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the methods described herein. In addition, in some aspects, the functionality described herein may be provided within dedicated hardware and/or software modules configured for encoding and decoding, or incorporated in a combined codec. Also, the example methods described above could be fully implemented in one or more circuits or logic elements.

The example methods of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed example methods, but do not necessarily require realization by different hardware units. Rather, as described above, various units may be combined in a codec hardware unit or provided by a collection of interoperative hardware units, including one or more processors as described above, in conjunction with suitable software and/or firmware.

The above description with reference to the accompanying drawings is provided to assist in a comprehensive understanding of certain embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments can be made without departing from the scope and spirit of the present disclosure. In addition, descriptions of well-known functions and constructions may be omitted for clarity and conciseness.

The terms used in the above description and following claims are not limited to their dictionary meanings, but, are merely used to enable a clear and consistent understanding of the present disclosure. Accordingly, it should be apparent to those skilled in the art that the following description of embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Examples

One example is a method including transmitting, by a first terminal including a radio, a request message for seeking service, receiving, by a peer terminal, the request message for seeking service, transmitting to the first terminal, by the peer terminal, a response frame advertising service including service provider attribute information. The method may also include receiving, by the first terminal, the response frame, and establishing, by the first terminal, a Wi-Fi direct connection with the peer terminal. The request message may include a service identity. The service provider attribute information may include a service identity, an advertisement identifier, a service MAC address, a network information mode, a regulatory class, channel information, a BSSID, a SSID, and/or a network ID. The request message for seeking service may be transmitted via Wi-Fi Neighbor Awareness Networking (NAN), Bluetooth Low Energy (BLE) or Near Field Communication (NFC). The response frame including service provider attribute information may be transmitted via Wi-Fi Neighbor Awareness Networking (NAN), Bluetooth Low Energy (BLE) or Near Field Communication (NFC). The Wi-Fi direct connection may be a P2P connection or an AP connection. The method may also include performing service discovery and Peer-to-Peer (P2P) provision discovery.

Another example is a terminal for connecting a service including a receiving unit that receives a request message for seeking service, a transmitting unit that transmits a response frame advertising service including service provider attribute information. The request message may include a service identity, for example. The service provider attribute information includes a service identity, an advertisement identifier, a service MAC address, a network information mode, a regulatory class, channel information, a BSSID, a SSID, and/or a network ID. The request message for seeking service may be transmitted via Wi-Fi Neighbor Awareness Networking (NAN), Bluetooth Low Energy (BLE) or Near Field Communication (NFC). The response frame including service provider attribute information may be transmitted via Wi-Fi Neighbor Awareness Networking (NAN), Bluetooth Low Energy (BLE) or Near Field Communication (NFC).

Another example is a terminal for connecting a service, the terminal including a transmitting unit that transmits a request message for seeking service, and a receiving unit that receives a response frame including service provider attribute information. The terminal may also include a radio unit for establishing a Wi-Fi direct connection with a peer terminal. The Wi-Fi direct connection may be a P2P connection or an AP connection. The radio unit may be configured to perform service discovery and Peer-to-Peer (P2P) provision discovery. The request message includes a service identity. The service provider attribute information includes a service identity, an advertisement identifier, a service MAC address, a network information mode, a regulatory class, channel information, a BSSID, a SSID, and/or a network ID. The request message for seeking service may be transmitted via Wi-Fi Neighbor Awareness Networking (NAN), Bluetooth Low Energy (BLE) or Near Field Communication (NFC). The response frame including service provider attribute information may be transmitted via Wi-Fi Neighbor Awareness Networking (NAN), Bluetooth Low Energy (BLE) or Near Field Communication (NFC).

Another example is a non-transitory computer-readable storage device including instructions stored thereon, which when executed by one or more processor(s) of a terminal, cause the first terminal to perform operations of receiving, by the terminal including a radio, a request message for seeking service, transmitting, by the terminal, a response frame advertising service including service provider attribute information. The request message includes a service identity. The service provider attribute information includes a service identity, an advertisement identifier, a service MAC address, a network information mode, a regulatory class, channel information, a BSSID, a SSID, and/or a network ID. The request message for seeking service may be transmitted via Wi-Fi Neighbor Awareness Networking (NAN), Bluetooth Low Energy (BLE) or Near Field Communication (NFC). The response frame including service provider attribute information may be transmitted via Wi-Fi Neighbor Awareness Networking (NAN), Bluetooth Low Energy (BLE) or Near Field Communication (NFC).

Another example is a non-transitory computer-readable storage device including instructions stored thereon, which when executed by one or more processor(s) of a terminal, cause the first terminal to perform operations of transmitting, by the terminal, a request message for seeking service, receiving, by the terminal, a response frame advertising service including service provider attribute information. It may also include the operation of establishing a Wi-Fi direct connection with a peer terminal. The Wi-Fi direct connection may be a P2P connection or an AP connection. The radio unit may be configured to perform service discovery and Peer-to-Peer (P2P) provision discovery. The request message includes a service identity. The service provider attribute information includes a service identity, an advertisement identifier, a service MAC address, a network information mode, a regulatory class, channel information, a BSSID, a SSID, and/or a network ID. The request message for seeking service may be transmitted via Wi-Fi Neighbor Awareness Networking (NAN), Bluetooth Low Energy (BLE) or Near Field Communication (NFC). The response frame including service provider attribute information may be transmitted via Wi-Fi Neighbor Awareness Networking (NAN), Bluetooth Low Energy (BLE) or Near Field Communication (NFC).

What is claimed is:

1. A service device for providing to a service seeking device a service using multiple radio assisted discovery, comprising:
    at least one memory that stores computer-executable instructions; and
    at least one processor configured to access the at least one memory, wherein the at least one processor is configured to execute the computer-executable instructions to:
        identify a probe request received from the service seeking device, the probe request including a hash value corresponding to the service;
        determine a match between the service and one or more services of the service device based at least in part on the hash value in the probe request;
        generate, by the service device, a probe response that comprises a service provider information (SPI) attribute field that includes at least an indication of a network connection associated with the service, wherein the computer-executable instructions to generate the probe response include computer-executable instructions to:
            generate a first Wi-Fi Neighbor Awareness Networking (NAN) service discovery frame when the probe request comprises a second NAN service discovery frame,
            generate a Bluetooth Low Energy (BLE) scan response frame when the probe request comprises a BLE scan frame, or
            generate a Near Field Communication (NFC) handover response frame when the probe request comprises a first NFC handover request frame;
        cause to send the probe response; and
        cause to initiate a communication session with the service seeking device.

2. The device of claim 1, wherein the at least one processor further configured to execute the computer-executable instructions to:
    identify a service discovery request received from the service seeking device, the service discovery request including an indication of a name of the service;
    determine a match of the service identified in the service discovery request with one or more services offered by the service device; and
    cause to send a service discovery response to the service seeking device.

3. The device of claim 1, wherein the indication of the network connection is a network configuration type field.

4. The device of claim 3, wherein the network configuration type field includes at least a P2P connection value.

5. The device of claim 3, wherein the network configuration type field includes at least an AP connection value.

6. The device of claim 1, wherein the probe request includes information identifying a wireless access point to which the service seeking device is connected.

7. The device of claim 1, wherein the SPI attribute field further includes at least an information field identifying a wireless access point to which the service device is connected.

8. The device of claim 1, wherein the at least one processor further configured to execute the computer-executable instructions to:
identify a peer-to-peer (P2P) provision discovery request received from the service seeking device;
cause to send a P2P provision discovery response to the service seeking device.

9. The device of claim 1, wherein the SPI attribute field includes at least a status information field indicating a status of the service.

10. The device of claim 1, wherein the at least one processor further configured to execute the computer-executable instructions to determine a name of the service from the hash value.

11. The device of claim 1, further comprising a transceiver configured to transmit and receive wireless signals.

12. The device of claim 11, further comprising one or more antennas coupled to the transceiver.

13. A non-transitory computer-readable medium storing computer-executable instructions that, when executed by at least one processor, configure the at least one processor to perform operations comprising:
identifying a probe request received from a service seeking device, the probe request including a hash value corresponding to a service;
determining a match between the service and one or more services of a service device based at least in part on the hash value in the probe request;
generating, by the service device, a probe response that comprises a service provider information (SPI) attribute filed that includes at least an indication of a network connection associated with the service, wherein generating the probe response includes generating:
a first Wi-Fi Neighbor Awareness Networking (NAN) service discovery frame when the probe request comprises a second NAN service discovery frame,
a Bluetooth Low Energy (BLE) scan response frame when the probe request comprises a BLE scan frame, or
a Near Field Communication (NFC) handover response frame when the probe request comprises a first NFC handover request frame; and
causing to send the probe response.

14. The non-transitory computer-readable medium of claim 13, wherein the at least one processor is further configured to execute the computer-executable instructions to perform an operation of causing to initiate a communication session with the service seeking device.

15. The non-transitory computer-readable medium of claim 13, wherein the computer-executable instructions for identifying the probe request includes computer executable instructions for identifying the probe request received from the service seeking device using a wireless peer-to-peer protocol.

16. The non-transitory computer-readable medium of claim 15, wherein the indication of the network connection is a network configuration type field.

17. The non-transitory computer-readable medium of claim 16, wherein the network configuration type field includes a P2P connection value.

18. The non-transitory computer-readable medium of claim 16, wherein the network configuration type field includes an AP connection value.

19. The non-transitory computer-readable medium of claim 13, wherein the at least one processor is further configured to execute the computer-executable instructions to perform operations comprising:
identifying a peer-to-peer (P2P) provision discovery request received from the service seeking device; and
causing to send a P2P provisions discovery response to the service seeking device.

20. The non-transitory computer-readable medium of claim 13, wherein the at least one processor is further configured to execute the computer-executable instructions to perform operations comprising:
identifying a service discovery request received from the service seeking device, the service discovery request including an indication of a service;
determining a match of the service identified in the service discovery request with one or more services offered by the service device; and
causing to a send service discovery response to the service seeking device.

* * * * *